US008862614B2

(12) United States Patent
Pradhan et al.

(10) Patent No.: US 8,862,614 B2
(45) Date of Patent: Oct. 14, 2014

(54) PLANNING-BASED AUTOMATED FUSING OF DATA FROM MULTIPLE HETEROGENEOUS SOURCES

(75) Inventors: Anu Raj Pradhan, Pittsburgh, PA (US); Burcu Akinci, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 13/808,691

(22) PCT Filed: Jul. 7, 2011

(86) PCT No.: PCT/US2011/043195
§ 371 (c)(1),
(2), (4) Date: Jan. 7, 2013

(87) PCT Pub. No.: WO2012/018475
PCT Pub. Date: Feb. 9, 2012

(65) Prior Publication Data
US 2013/0124561 A1 May 16, 2013

Related U.S. Application Data

(60) Provisional application No. 61/400,959, filed on Aug. 5, 2010.

(51) Int. Cl.
*G06F 17/30* (2006.01)
*G06F 7/00* (2006.01)

(52) U.S. Cl.
CPC .... *G06F 17/30424* (2013.01); *G06F 17/30557* (2013.01)
USPC .......................................................... 707/769

(58) Field of Classification Search
None
See application file for complete search history.

(56) References Cited

U.S. PATENT DOCUMENTS

| 6,269,368 | B1 | 7/2001 | Diamond | |
|---|---|---|---|---|
| 2002/0143774 | A1 | 10/2002 | Vandersluis | |
| 2002/0165860 | A1* | 11/2002 | Glover et al. | 707/5 |
| 2004/0068486 | A1* | 4/2004 | Chidlovskii | 707/3 |
| 2007/0050347 | A1* | 3/2007 | Johannes Maria Meijer et al. | 707/4 |
| 2008/0005075 | A1* | 1/2008 | Horvitz et al. | 707/3 |
| 2008/0172356 | A1 | 7/2008 | Bruno et al. | |
| 2008/0288889 | A1* | 11/2008 | Hunt et al. | 715/810 |
| 2009/0271389 | A1 | 10/2009 | Chickering et al. | |

OTHER PUBLICATIONS

Stone, Harold, The average complexity of depth first search with backtracking and cutoff, May 1986, IBM Journal of Research and Development, pp. 242-258.*

(Continued)

*Primary Examiner* — Jacob F Bétit
*Assistant Examiner* — Karina Levitian
(74) *Attorney, Agent, or Firm* — Downs Rachlin Martin PLLC

(57) ABSTRACT

Methods and software for automatedly answering dynamic queries requiring fusing of data from various ones of multiple available heterogeneous data sources. The data sources are characterized and interrelated using a suitable ontology. In one implementation, each dynamic query is analyzed to determine the data items required to answer that query, along with their levels of detail. The data items and levels of detail are used to determine which ones of the multiple data sources are needed to answer the query. The data items, levels of detail, and the ontology of the data sources are then used to automatedly develop a data-fusing plan for fusing data from the needed data sources in a manner that answers the query. The data-fusing plan is executed, and the query is answered.

48 Claims, 8 Drawing Sheets

(56) References Cited

OTHER PUBLICATIONS

Ko, R.K.L. et al., Dynamic Collaborative Business Process Formulation via Ontologised Hierarchical Task Network Planning, 2009, IEEE International Conference on Digital Object Identifier, pp. 959-967.*

Manoj, Internet using meta-search engines: A review, Oct. 2008, Journal of Scientific and Industrial Research (herein 'IRI').*

Montague, Condorcet Fusion for Improved Retrieval, Nov. 4, 2002, CIKM.*

Meng et al. A Highly Scalable and Effective Method for Metasearch, Jul. 2001, ACM Transactions on Information Systems, vol. 19, 310-333.*

International Search Report and Written Opinion dated Feb. 9, 2012, in connection with related PCT/US2011/043195, filed Jul. 7, 2011, Pradhan.

* cited by examiner

PLANNING-BASED AUTOMATED FUSING OF DATA FROM MULTIPLE HETEROGENEOUS SOURCES

RELATED APPLICATION DATA

This application claims the benefit of priority of U.S. Provisional Patent Application Ser. No. 61/400,959, filed on Aug. 5, 2010, and titled "Methods And Systems For Automated Planning-Based Data Fusion From Multiple Sources," which is incorporated by reference herein in its entirety.

GOVERNMENT RIGHTS

The invention was made with partial government support under National Science Foundation Grant No. 0448170. The U.S. Government may have certain rights in this invention.

FIELD OF THE INVENTION

The present invention generally relates to the field of data fusion. In particular, the present invention is directed to planning-based automated fusing of data from multiple heterogeneous sources.

BACKGROUND

Data fusion generally involves the concept of combining data items from multiple, distributed, and/or heterogeneous data sources. Data fusion is a powerful tool and can be used, for example, to assist a user with any one or more of a variety of tasks, such as recognition, identification, tracking, change detection, decision making, and prediction, among other things. These tasks are improved by integrating data from multiple sources. In many situations, however, the heterogeneity of the data derived from or held in disparate sources creates substantial hurdles to fusing that data.

SUMMARY OF THE DISCLOSURE

In one implementation, the present disclosure is directed to a method of answering a dynamic query having an answer that requires the fusing of data from among multiple heterogeneous data sources. The method includes receiving the dynamic query; automatedly evaluating the dynamic query to determine data items and levels of detail needed to provide the answer; automatedly developing a data-fusing plan based on an ontology of the multiple heterogeneous data sources as a function of the data items and levels of detail, wherein the data-fusion plan includes one or more steps for creating fused data; automatedly executing the one or more steps to create the fused data based on the data items; and automatedly generating the answer based on the fused data.

In another implementation, the present disclosure is directed to a machine-readable storage medium containing machine-executable instructions for performing a method of answering a dynamic query having an answer that requires the fusing of data from among multiple heterogeneous data sources. The machine-executable instructions include a first set of machine-executable instructions for receiving the dynamic query; a second set of machine-executable instructions for automatedly evaluating the dynamic query to determine data items and levels of detail needed to provide the answer; a third set of machine-executable instructions for automatedly developing a data-fusing plan based on an ontology of the multiple heterogeneous data sources as a function of the data items and levels of detail, wherein the data-fusion plan includes one or more steps for creating fused data; a fourth set of machine-executable instructions for automatedly executing the one or more steps to create the fused data based on the data items; and a fifth set of machine-executable instructions for automatedly generating the answer based on the fused data.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

One aspect of the present disclosure includes methods for answering dynamic queries that require the fusion of data from among multiple heterogeneous data sources. These methods rely on a planning-based scheme that utilizes automated query analyses, an ontology of the data sources, and automated planning to 1) automatedly identify which ones of a number of data sources are needed to answer the query and 2) automatedly develop a plan for extracting the necessary data from the needed data sources and for combining the data in a manner that satisfies the query. Strengths of methods implementing aspects of the present disclosure are that the queries are dynamic, i.e., are not limited to pre-defined queries despite the fact that they operate on multiple heterogeneous databases, and that the entire query-answering process is automated. Conventional data fusion schemes lack this dynamic-nature and automation. These and other strengths of the methods, software, systems, apparatuses, etc. disclosed herein will become apparent upon reading this entire disclosure.

Figure 1:
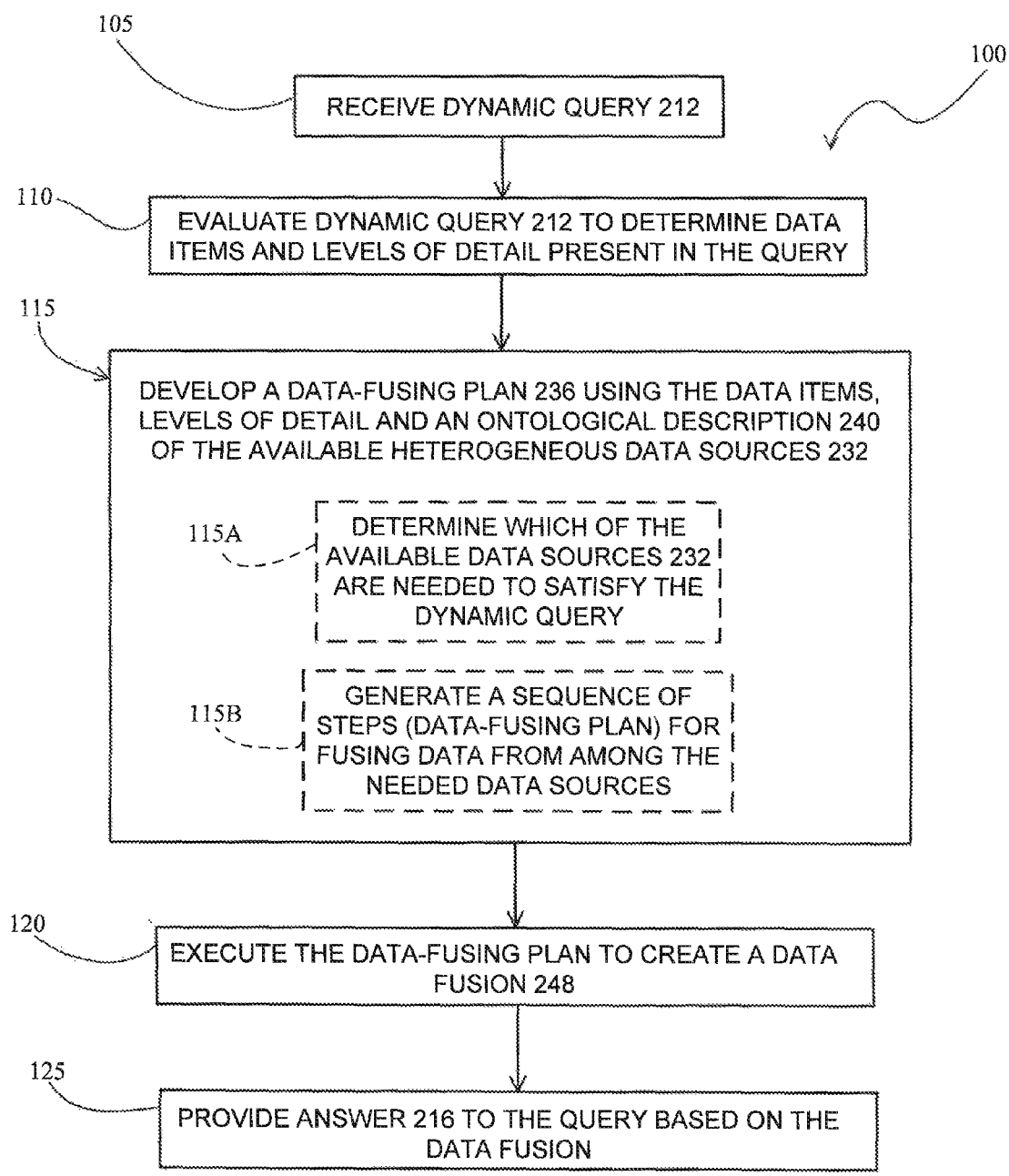
FIG. 1 is a flow diagram of a method of answering a dynamic query that requires fusing of data from multiple heterogeneous data sources.
Figure 2:
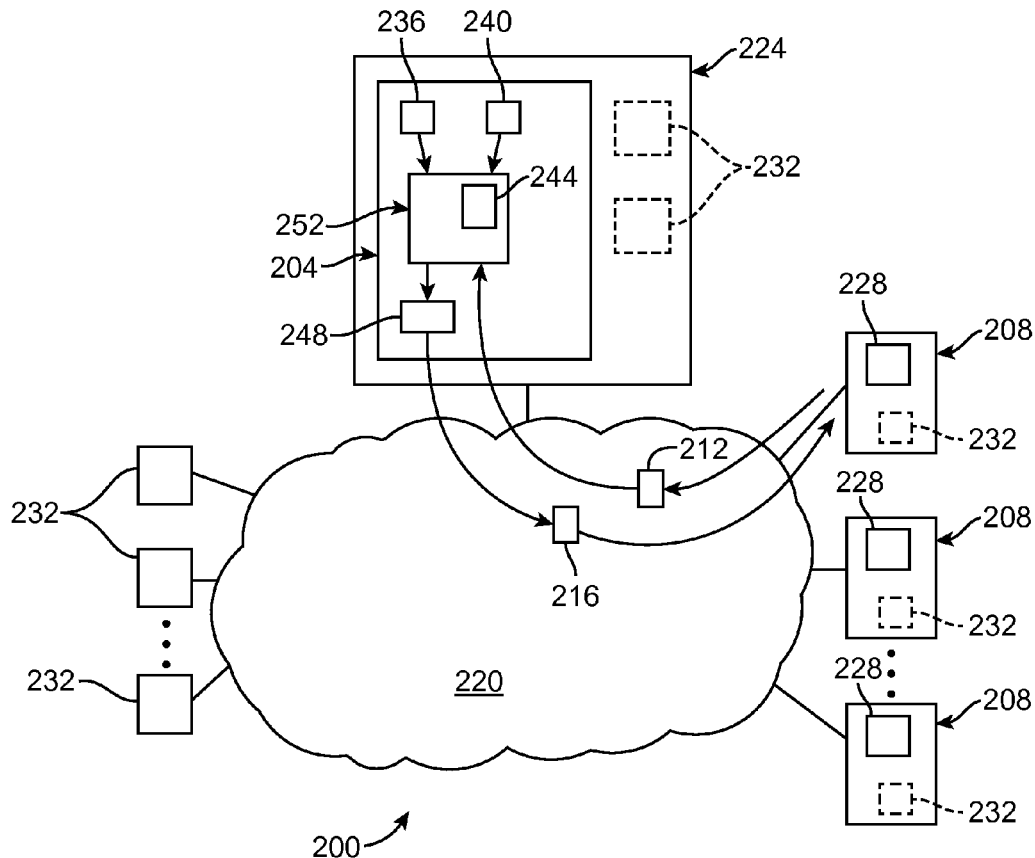
FIG. 2 is a high-level diagram of a data fusion system in an exemplary operating environment.

Referring now to the drawings, FIG. 1 illustrates an exemplary method 100 of answering a dynamic query that requires fusing of data from multiple heterogeneous data sources, and FIG. 2 illustrates an exemplary environment 200 that is suitable for implementing method 100. It is noted here at the outset that environment 200 is used simply for the purposes of illustration. Those skilled in the art will readily appreciate that method 100, as well as other methods implementing various features of the present disclosure, can be implemented in environments other than environment 200. Because such alternative environments are known, it is not necessary to describe or even list other types of environments. That said, where appropriate, some alternatives of various parts and features of environment 200 are presented to give a sense of scope.

With continuing reference to FIG. 2, in this example environment 200 includes a dynamic query-based automated data fusion (ADF) system 204 that is in operative communication with one or more querying machines 208. In this context, a "querying machine" is any machine, such as a laptop computer, desktop computer, workstation, tablet computer, Internet appliance, smartphone, personal multimedia device (e.g., an IPAD® device available from Apple, Inc., Cupertino, Calif.), etc. that allows a user (not shown) to generate a dynamic query 212 directed to ADF system 204. Typically, though not necessarily, the querying machine 208 that generates a particular query 212 will be the machine that receives the answer 216 to that query from ADF system 204. In the present example, each querying machine 208 is shown as being in operative communication with ADF system 204 via cloud 220, which represents any one or more communications systems suitable for the particular instantiation of environment 200. For example, if a particular querying machine 208 is a desktop computer and ADF system 204 is implemented in a web server 224, cloud 220 can represent, for example, the Internet and a local-area network (LAN) that the querying machine is connected to. As another example, if ADF system 204 and each querying machine 208 are part of a site-specific enterprise system, cloud 220 can represent only a LAN. As a further example, if a particular querying machine 208 is a smartphone, cloud can represent the Internet, a cellular communications network, and any other communications system(s) needed to complete the communications path between that querying machine and ADF system 204. Though not particularly illustrated, ADF system 204 can be integrated into any of querying machines 208. Clearly, the possible environments for ADF system 204 or a similar system incorporating various features of the present disclosure are myriad.

With the possible variations of environment 200 being so numerous, those skilled in the art will readily understand that the manners in which the user interfaces 228 for ADF system 204 can be implemented are also diverse. For example, if ADF system 204 is Web-based, user interface 228 at each querying machine 208 for query 212 and answer 216 can be Web-browser based. Alternatively, each querying machine 208 can execute a software application dedicated to providing a user interface 228 that is customized to ADF system 204. However, if ADF system 204 and querying machines 208 are parts of an on-site enterprise system, user interface 228 on each querying machine 208 can be a dedicated interface of the ADF system. The same can be true in the case wherein ADF system 204 is integrated into a querying machine 208.

Environment 200 also includes a number of data sources 232, each containing data that can be used to answer a dynamic query, such as query 212, depending on the content of that query. Each data source 232 can be virtually any source of data needed to satisfy a query, such as a database, sensor, or sensor-data recorder among others. Examples of databases that can be some or all of data sources 232 include, but are not limited to, databases corresponding to project management systems, time-keeping systems, billing systems, construction data systems, docketing systems, sensor-network systems, infrastructure monitoring systems, inventory systems, financial data systems, etc. There is fundamentally no limitation on the type of database that can be a data source 232 useful to a particular instantiation of an ADF system of the present disclosure, such as ADF system 204 of FIG. 2. Examples of sensors or sensor data recorders that can be some or all of data sources 232 include, but are not limited to, temperature sensors, accelerometers, strain gauges, pressure sensors, precipitation sensors, level sensors, weight sensors, among many more. Fundamentally, there is no limitation on the type of sensors and sensor recorders that can be a data source 232 useful to a particular instantiation of an ADF system of the present disclosure, such as ADF system 204 of FIG. 2. Data sources 232, like querying machines 208, can be local to ADF system 204, local to any one or more of the querying machines, spread out over one or more networks, e.g., Internet or other wide-area network(s), LAN(s), wireless communications network(s), etc., and any combination thereof, as those skilled in the art will readily appreciate.

With the basics of exemplary environment 200 having been described, attention is now turned to illustrative method 100 (FIG. 1) of answering a dynamic query, here, dynamic query 212, that requires fusing of data from multiple heterogeneous data sources, here various ones of data sources 232. Referring now to FIG. 1, and also to FIG. 2, method 100 may begin at step 105 at which ADF system 204 receives dynamic query 212 from the corresponding one of querying machines 208. At step 110, ADF system 204 evaluates query 212 to determine the data items and their levels of detail needed, if any, for ADF system 204 to generate answer 216 to the query. As those skilled in the art will readily understand, evaluating query 212 can include a lexical analysis in which the query is converted into tokens and a parsing analysis to recognize the grammar of the tokens. Once it has analyzed the grammar of query 212, ADF system 204 can determine the data items contained in the query, as well as any level of detail for each data item.

Once ADF system 204 has determined the data items and levels of detail needed to generate answer 216 to dynamic query 212, at step 115 the ADF system develops a data-fusing plan 236 using the determined data items and levels of detail, as well as a data-fusion ontological description 240 of the available heterogeneous data sources 232. Ontological description 240 essentially describes the data items available from each of heterogeneous data sources 232 and characterizes all of the relationships of the data items across the data sources in a way that allows ADF system 204 to fuse data from among multiple ones of the available data sources. Ontological description 240 can be, for example, a domain-based description based on a single ontology, multiple ontologies, or a hybrid ontology. All of these ontology types are known in the art.

Step 115, at which ADF system 204 develops a data-fusing plan 236, can be broken down, for example, into two sub-steps, such as steps 115A and 115B. At step 115A, ADF system 204 (FIG. 2) determines which ones of multiple heterogeneous data sources 232 are needed to answer query 212 based on the data items and their levels of detail as determined at step 110 (FIG. 1), as well as ontological description 240. In one example, ADF system 204 determined the needed ones of data sources 232 using graph-theoretic reasoning that utilizes a graph structure to help identify the data sources needed for fusion. An example of a graph theoretic approach is described below in connection with an exemplary implementation of method 100.

After ADF system 204 has determined which ones of data sources 232 are needed to answer query 212 at step 115B, the ADF system generates a sequence of steps (data fusion plan 236) for fusing data from among the needed data sources that the ADF system will use in answering the query. To do this, ADF system 204 utilizes a planner 244, such as the domain-independent "GraphPlan" planner or a domain-dependent hierarchical task network (HTN) planner or probabilistic planner, among others.

As a bit of further information on planners suitable for use as planner 244, the GraphPlan planner is a general-purpose neo-classical planner based on ideas used in graph algorithms. Given a problem statement, the GraphPlan planner explicitly constructs and annotates a compact structure called a "planning graph," in which a plan is a sequence of steps, with the steps being represented by nodes on the graph and the sequence represented by the ordering of the nodes via directed edges of the graph. This graph has the property that useful information for constraining search can quickly be propagated through the graph as it is being built. The Graph-Plan planner then exploits this information in the search for a plan. The GraphPlan planner was originally developed at Carnegie Mellon University, Pittsburgh, Pa., with subsequent extensions and improvements made by many researchers at many different institutions around the world.

HTN planners are classical planners that represent a plan as a set of tasks, distinguishing them from other planners, such as the GraphPlan planner just described. A task can be either a primitive task or non-primitive task. A primitive task cannot be further decomposed, and it can be performed using a planning operator, while a non-primitive task can be recursively decomposed into smaller tasks. Compared with neo-classical planners, HTN planners have intuitive and enhanced knowledge representation (hierarchical task) and reasoning capabilities. However, they require the involvement of a domain expert to define planning domain knowledge. For instance, Simple Hierarchical Order Planner (SHOP) and O-Plan are some of the domain independent HTN planners that can be augmented with domain specific knowledge. HTN planners take advantage of structures (often captured in the form of hierarchies of non-primitive tasks) inherent for a given planning problem. Such problem-solving structure is often captured with the help of human domain experts. An advantage of HTN planners is that they have been successfully used to solve complex plans having large number of states. However, a disadvantage of domain-dependent HTN planners is the need for human domain experts to define problem-solving structures. Further information on planners is found below in the EXEMPLARY IMPLEMENTATIONS section and in publications and other information generally available. That section specifically addresses adaptations of GraphPlan and HTN planners to the automated data-fusing-plan generations methodologies of the present disclosure.

Referring again to FIGS. 1 and 2, after ADF system 204 has generated data fusion plan 236 at step 115, method 100 can proceed to step 120 at which the ADF system executes the data fusion plan so as to generate fused data 248 satisfying query 212 that essentially becomes answer 216 to the query. At step 125, ADF system 204 provides answer 216 to query 212 based on fused data 248. Those skilled in the art will readily appreciate that the manner in which ADF system 204 provides answer 216 to the originating one of querying machine 208 and/or another destination will depend on the configuration of environment 200 and the relationship between the ADF system and the destination(s) of the answer. Since those skilled in the art will readily understand how ADF system 204 can provide answer 216 to each destination given a particular configuration of environment 200 and relationship between the ADF system and the destination(s), no further description or listing of examples is needed for skilled artisans to carry out the disclosed subject matter to its fullest scope.

Figure 10:
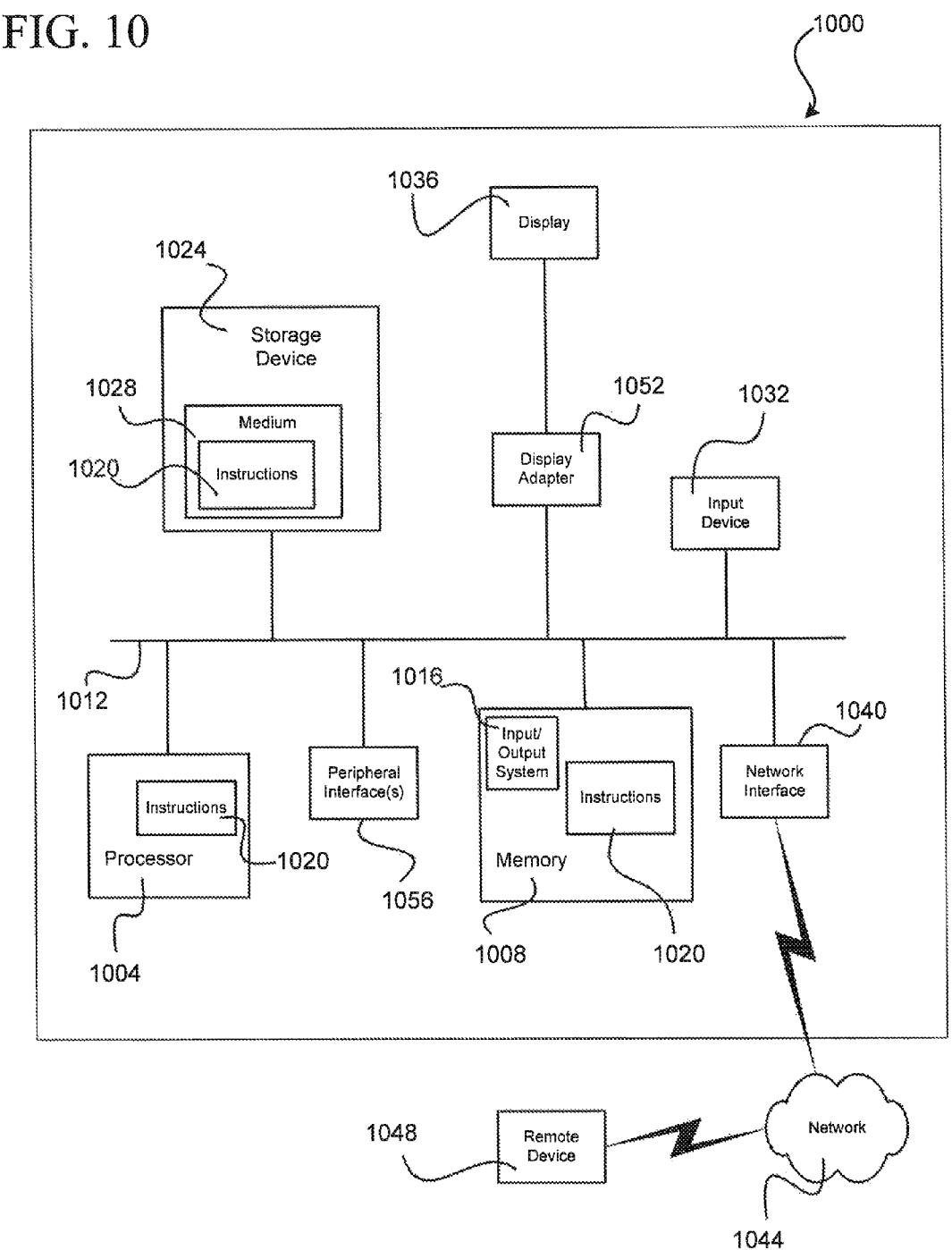
FIG. 10 is high-level schematic diagram of an exemplary software-driven machine capable of implementing systems and methods of the present invention.

As those skilled in the art can also readily understand, ADF system 204 functionality can be readily instantiated in software 252 by skilled artisans. Such software 252 can be designed and configured for the particular configuration of environment 200. Exemplary instantiations of software 252 include a stand-alone application running on a server or a general-purpose computer, a set of software components running on differing machines, such as in the case of an application running on a server and an applet running on each querying machine, among others. Software 252 can also be designed and configured to be executed in a single- or multi-processor environment. The variations are diverse, and the general knowledge of a person of ordinary skill in the art would allow them to design and configure software 252 for any configuration of environment 200 without undue effort. FIG. 10, below, illustrates an exemplary computer system 1000 that can be used to implement ADF system 204 and/or any components thereof or relating thereto.

Exemplary Implementations

Following are descriptions of exemplary implementations of the various aspects of method 100 described above. These description should give the reader not only insight into a specific implementation, but also a more thorough understanding of aspects of method 100. It is noted that while the context of the following implementations is in the domain of construction management, method 100 and similar methods devised in accordance with the present disclosure are certainly not limited to that domain. Rather, as mentioned above, there is fundamentally no limitation of the nature of the data that can be fused using a method of the present disclosure.

Capturing and Reasoning about User Queries

Figure 3:
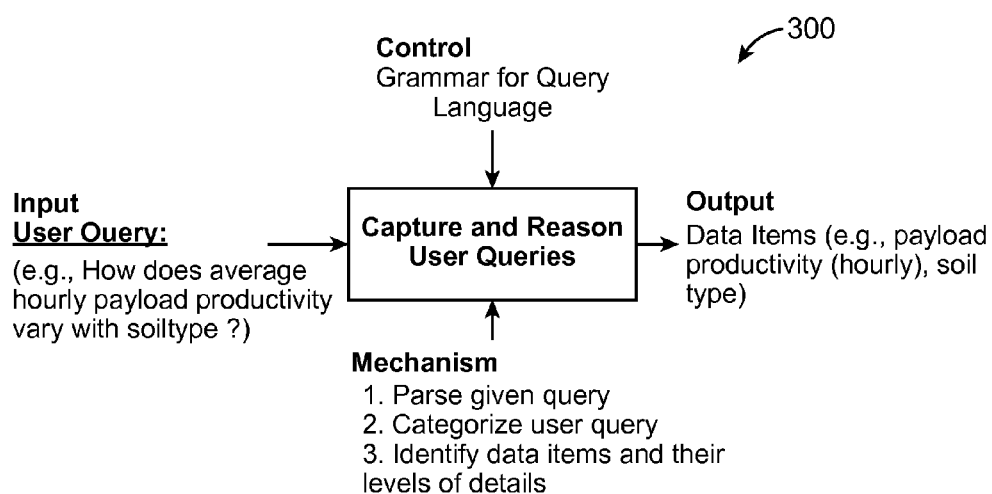
FIG. 3 is an integration definition for functional modeling (IDEF0) diagram for capturing and reasoning about dynamic user queries.

As described above in connection with FIGS. 1 and 2, the development of a data fusion plan is predicated on receiving a query that requires access to multiple heterogeneous data sources to answer the query. This section describes an exemplary formal representation of query capture language that can be used in implementing queries. Such formal representation constitutes a grammar of the query capture language. First, an exemplary process of capturing and reasoning about user queries is briefly discussed. FIG. 3 shows the Integration Definition for Functional Modeling (IDEF0) diagram 300 of capturing and reasoning about user queries. As described above, a user query acts as an input to an ADF system of the present disclosure. The user query is captured using a domain specific language. The user query is parsed to extract data items (e.g., payload and soil type in the construction management domain) and their levels of details with the help of parser, which utilizes grammar.

In the present implementation, the ADF system uses a parser to parse user queries. One example of such a parser is Another Tool for Language Recognition (ANTLR) tool. The ANTLR tool uses an "LL(*)" parsing scheme, in which the tool parses a given input from left to right and constructs a leftmost derivation of the input. Hence, the ANTLR tool is called LL parser. The "(*)" in "LL(*)" signifies that the ANTLR tool can handle an arbitrary number of look-ahead tokens compared to LL(k) parser which is limited to a finite amount of look-ahead tokens, which is defined by k. Look-ahead refers to scanning ahead a given number of tokens (i.e., k tokens) in the input to make a decision for parsing. Thus, building grammar using an LL(*) parser is flexible in terms of defining user query compared to an LL(k)-based parser because in practice it is often difficult to determine ahead the number of tokens for a given query. For example, in a construction productivity-related query, a user can be interested in either one factor or a list of factors that can impact productivity. In such situation, an LL(*) parser can process a query with dynamic number of factors compared to an LL(k) parser. The grammar for query capture language can be represented in a number of forms, such as Backus Naur Form (BNF) and Extended Backus Naur Form (EBNF). The next section describes the key components of an exemplary user query.

Components of Query Capture Language

Figure 4:
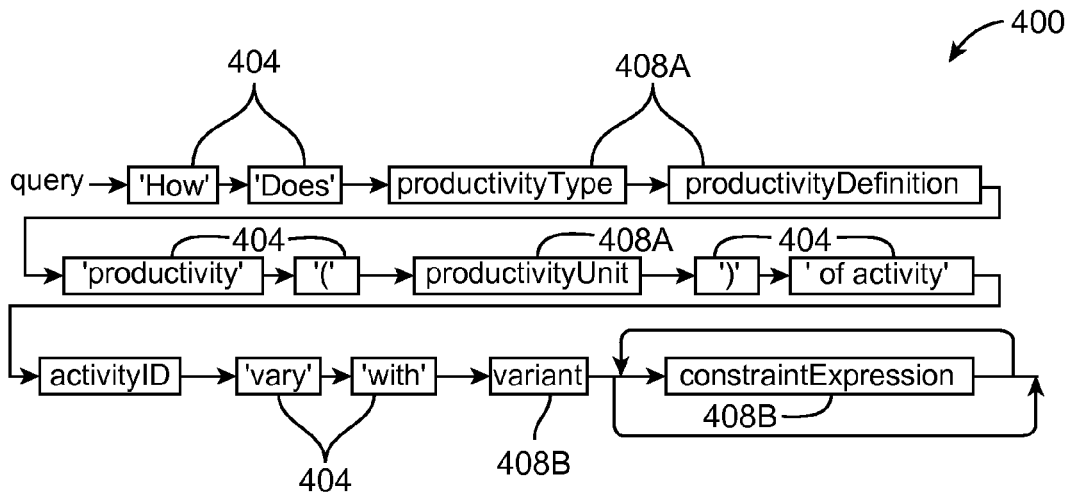
FIG. 4 is a diagram of an exemplary dynamic user query illustrating various components of the query.

The query capture language of the present implementation consists of three main components to capture information related to the domain of the user's query. In one embodiment of the present implementation, namely its use in construction project management, information is captured related to productivity, factors affecting productivity, and query constraints. A syntax diagram 400 of query components (shown as rectangles) is depicted in FIG. 4. The components 404 that start and end with a single quotation mark are fixed string constants. The components 408A and 408B that contain no quotation mark are variables, which can be either a simple expression or nested expressions. The components 408A are related to productivity capture information, specifically to productivity type (i.e., productivityType), productivity definition (i.e., productivityDefinition) and productivity unit (i.e., productivityUnit). The components 408B related to factors affecting productivity and user constraints are respectively the variant and constraintExpression components.

An example query (e.g., "How does average payload productivity (ton/hour) of activity 'Excavate Station 254 to 260' vary with soil, temperature orderBy temperature?") related to highway excavation activity is used to illustrate the components of the query capture language. In the example query, average defines the productivity type, which can be either average or, maximum or minimum. The productivityType component is defined as one of the alternative literal constants (i.e., average, maximum, and minimum), while productivityDefinition expression is defined as one of the alternative set of nested expressions. The productivityDefinition expression represents different definitions of productivity. Different definitions of productivity, such as factor productivity, partial factor productivity, total factor productivity and general productivity can be expressed with productivityDefinition expression. The example query illustrates the general productivity definition which is defined as the ratio of payload (i.e., output) to work hour. For other definitions of productivity, the reader can consult, for example, Goodrum, P. M., and Haas, C. T., "Long-Term Impact of Equipment Technology on Labor Productivity in the U.S. Construction Industry at the Activity Level," Journal of Construction Engineering and Management, 2004, 130(1), 124-133. The productivity Unit expression represents the productivity unit (e.g., ton/hour, ton/minute). The variant expression represents a list of factors that affect productivity. Users can define one or more factors (e.g., soil and temperature). The constraintExpression expression, which is optional, enables capturing spatial and temporal constraints of a query.

To reason about a user query expressed in query capture language, two steps are used in the present implementation: the first step constitutes the lexing and parsing of a user query, and the second step constitutes identifying data items and their levels of detail from a given user query. In the next section, the process of identifying applicable data sources is discussed.

Identification of Applicable Data Sources

Figure 5:
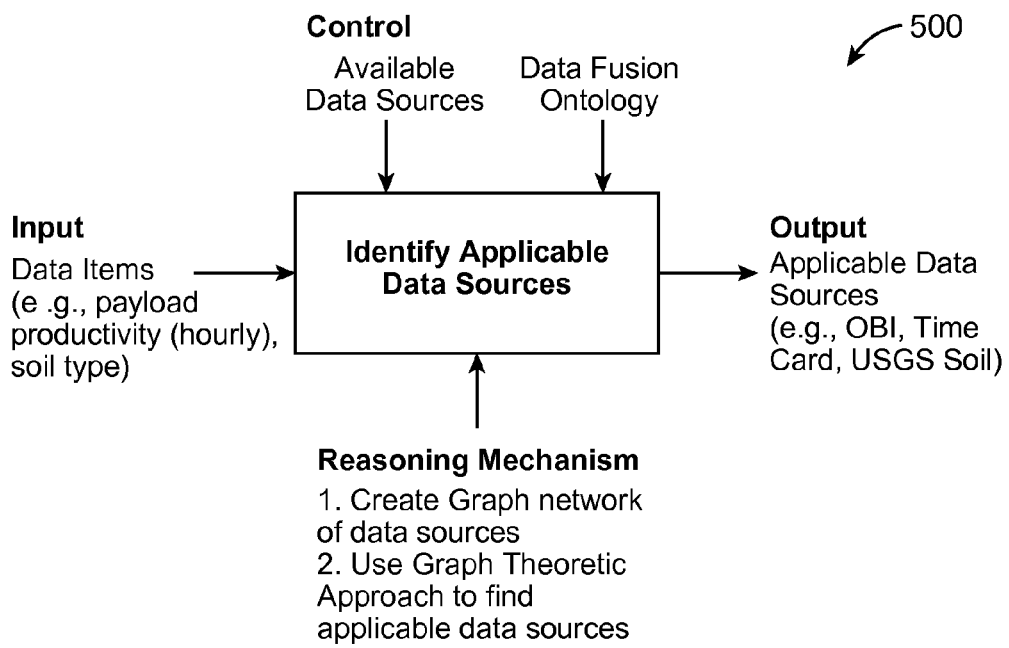
FIG. 5 is an IDEF0 diagram for identifying a set of needed data sources from available data sources.

The process of identifying applicable set of data sources from an available set of data sources captured in the IDEF0 diagram 500 of FIG. 5. The inputs to the identification process are the data items and their levels of detail, and these inputs are obtained from analyzing a user query. Available data sources and data fusion ontology are the controls to the identification process. The graph-theoretic reasoning mechanism reasons about the data fusion ontology and a set of input data items to identify applicable set of data sources. In the research, the graph-theoretic reasoning mechanism is adopted because the graph-structure, which is the representation for graph-theoretic approach, helps to identify additional data source needed for fusion as discussed below.

Data Fusion Ontology

A data fusion ontology is used to enable different types of data fusion tasks, such as (a) identifying applicable data sources and (b) generating sequence of steps (data fusion plan) for fusion. Within the context of the present implementation, the main purpose of the data fusion ontology is as an enabler to identify a set of applicable data sources from a given set of available data sources. The data fusion ontology described in the present implementation can be used in both a single ontology approach and a hybrid ontology approach (i.e., upper ontology).

Figure 6:
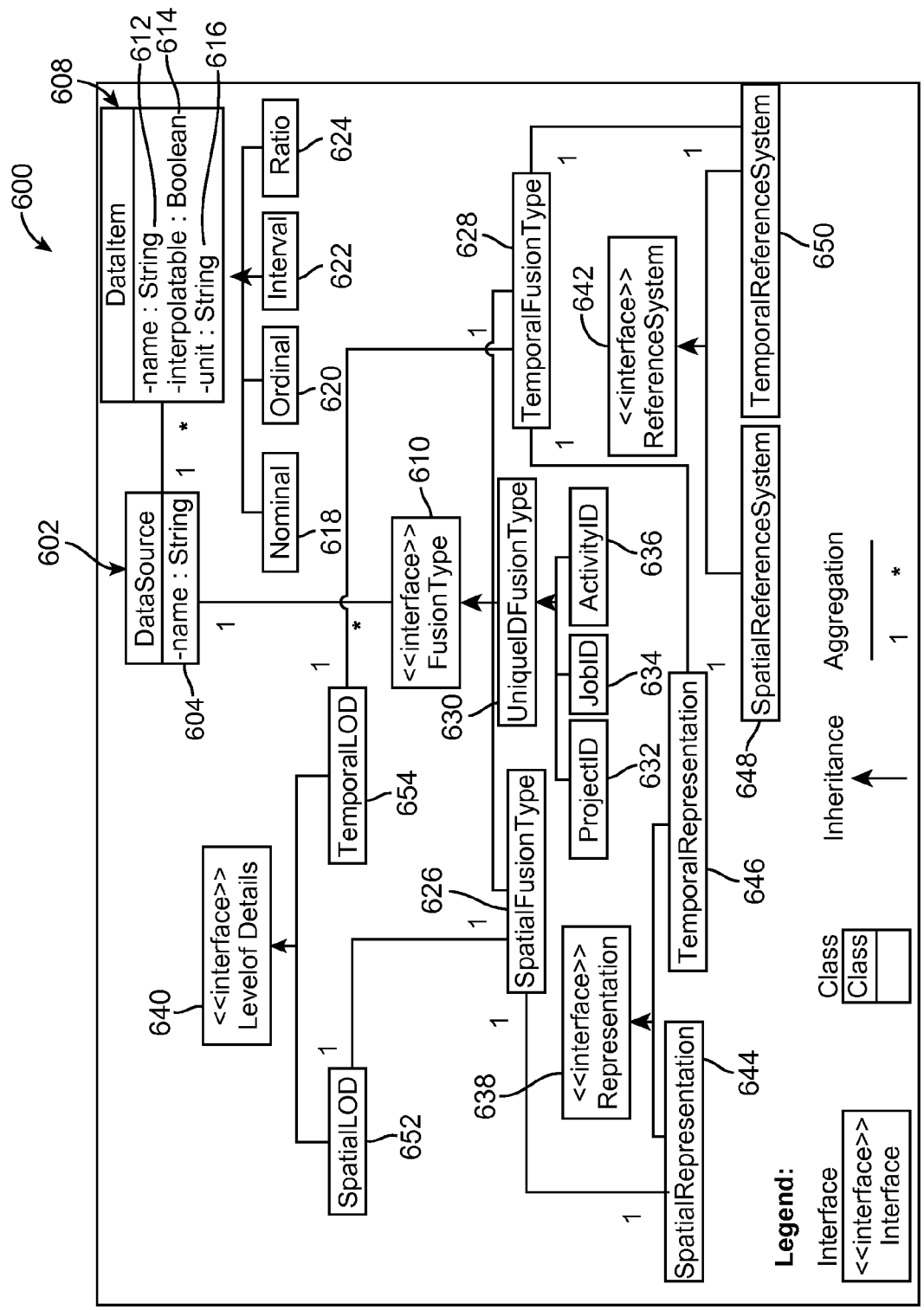
FIG. 6 is a diagram of an exemplary data fusion ontology.

FIG. 6 shows a Unified Modeling Language (UML) class diagram 600 representing the data fusion ontology of the present implementation. The data fusion ontology is used to represent the data items, levels of detail, representation, and reference system of a given data source. A data source is represented by the DataSource class 602, and each DataSource class has three attributes: 1) name 604 as String class, 2) data items as a collection of DataItem classes 608, and 3) fusionTypes as a collection of FusionType classes 610. DataItem 608, which is an abstract class, represents a data item of a given data source, and the DataItem class contains three attributes: 1) name 612 as String class, 2) interpolatable 614 as Boolean class, and 3) unit 616 as String class to capture the measurement unit. DataItem class 608 has four subclasses: 1) Nominal 618, 2) Ordinal 620, 3) Interval 622, and 4) Ratio 624. Nominal class 618 represents categorical data item to represent different categories of objects, such as data item representing different types of soil types (e.g., silt and loam). Ordinal class 620 represents data item having notion of ordering. For instance, data items that represent safety ratings (in the range of 1 to 5) belong to Ordinal class 620. Interval and Ratio classes 622, 624, respectively, represent data items with quantitative attributes. The arithmetic operations, such as addition, subtraction, multiplication and division, can be performed on Ratio class 624. However, only the operations, such as addition and subtraction operations can be carried out on Interval class 622.

Any two data sources can be fused by leveraging common overlapping information. In one case study, the present inventors used either space or time information, or unique identification number (e.g., project number, job number and activity number) to fuse two data sources. Such information is termed as "fusion type," and the present inventors identified three types of fusion types in the current implementation: 1) spatial, 2) temporal, and 3) unique identification. FusionType class 610, which is an abstract interface, represents the fusion type of a data source, and there are three subclasses of fusion types, namely, a SpatialFusionType class 626, a TemporalFusionType class 628, and a UniqueIDFusionType class 630 to represent space, time, and unique identification information, respectively. If a data source contains either one or multiple unique identification numbers (which are not related to time and space domains), such as project number, job number and activity number, subclasses UniqueIDFusionType class 630, such ProjectID class 632, JobID class 634, and ActivityID class 636, are used. The present inventors identified that spatial and temporal fusion types constitute three characteristics: 1) level of detail, 2) representation, and 3) reference system. Thus, the SpatialFusionType class 626 and TemporalFusion- Type class 628 contain three attributes that are associated with subclasses of Representation interface 638, LevelofDetails interface 640, and ReferenceSystem interface 642.

Representation interface 638 has two subclasses, namely, a SpatialRepresentation class 644 and TemporalRepresentation class 646, which are related with spatial and temporal representation of data sources respectively. SpatialRepresentation class 644 can be subclassed into different classes to represent different types of spatial representations. For example, spatial objects, such as rivers, roads, and geographic boundaries are represented in the form of points, lines, and polygons. As another example, a road centerline can be represented as a line feature. Similarly, an excavated area for highway construction can be represented as polygon features. Thus, subclasses, such as Solid, Plane, Sphere, Polygon, Line and Point classes (not shown) can be used to represent spatial objects. For TemporalRepresentation class 646, TemporalInterval and TemporalPoint classes (not shown) can be used to represent temporal intervals and temporal point. A temporal point is defined with single time information, while a temporal interval is defined with two temporal points.

ReferenceSystem interface 642 has two subclasses, namely a SpatialReferenceSystem class 648 and TemporalReferenceSystem class 650 to represent the reference systems of spatial and temporal data sources respectively. SpatialReferenceSystem class 648 is designed to represent geographic coordinate systems. Geographic coordinate system defines every location on the earth based on the spherical coordinate system aligned with the spin axis of the earth. There are different types of geographical co-ordinate systems, such as Universal Transverse Mercator (UTM), World Geodetic System (WGS), State Plane Coordinate Systems, and Lambert Coordinate System, among others. Thus, different subclasses of SpatialReferenceSystem class 648 can be created to represent the different geographical co-ordinate systems. The TemporalReferenceSystem class 650 is designed to represent temporal reference system, such as Greenwich Mean Time (GMT), Eastern Standard Time (EST), and Pacific Standard Time (PST), among others.

LevelofDetails interface 640 has two subclasses for spatial and temporal data sources: a SpatialLOD class 652 and a TemporalLOD class 654. "Level of detail" is defined as the granularity contained in data. For example, on-board instrumentation (OBI) on a truck collects and stores production data for an earthwork activity in cycle times (e.g., minutes and seconds). Similarly, time card databases typically provide data on a daily basis, whereas temperature database typically provides data on an hourly basis. Thus, different subclasses (e.g., Minute, Hour, and Week classes) (not shown) under the TemporalLOD class 654 can be created to capture different temporal levels of detail. Similarly, various subclasses (e.g., Mile, Yard, and Foot classes) (not shown) can be created under SpatialLOD class 652 to represent different spatial levels of detail. Thus, in general, a data fusion ontology captures the data items and fusion types of a given data source. The next section discusses an exemplary reasoning mechanism that utilizes the data fusion ontology to identify applicable data sources.

Exemplary Reasoning Mechanism for Identifying Applicable Data Sources

An exemplary reasoning mechanism for identifying a set of applicable data sources from a set of available data sources is based on a graph-theoretic approach. A graph-theoretic approach generally consists of two steps: 1) constructing a graph consisting of available data sources, and 2) traversing through the graph to identify applicable data sources. During the construction of a graph, such as graph 700 of FIG. 7, each data source is represented as a vertex 704. An edge 708 connecting two vertices 704 is constructed only if two given data sources share a common fusion type. For instance, OBI data source has a temporal fusion type, and thus its data can be fused with time card data source and temperature data sources, since both time card and temperature data sources have time fusion types. Therefore, edges 708A and 708B are drawn. Similarly, since soil and rock data sources share a common fusion type (spatial), there is an edge 708C connecting these two data sources. Besides a common fusion type, when constructing an edge 708, level of detail information based on user query is used to ensure whether an edge can be created or not. For instance, if the user query expects an hourly productivity rate, an edge between the time card and OBI vertices 704 will not be created, assuming that the OBI data source contains hourly payload information and time card data source contains only daily payload information. However, if the user query expects daily productivity rate, edge 708A between the time card and OBI vertices is created as cycle time OBI data can be aggregated into daily payload data. The weight assigned to each edge 708 is equal to one as there is no preference given to a particular edge. In addition, edges 708 have no direction (i.e., undirected). In one embodiment of the present instantiation, weights are assigned based on the quality of data sources. The output of the graph construction process is an un-weighted and undirected graph, such as graph 700 of FIG. 7.

Figure 7:
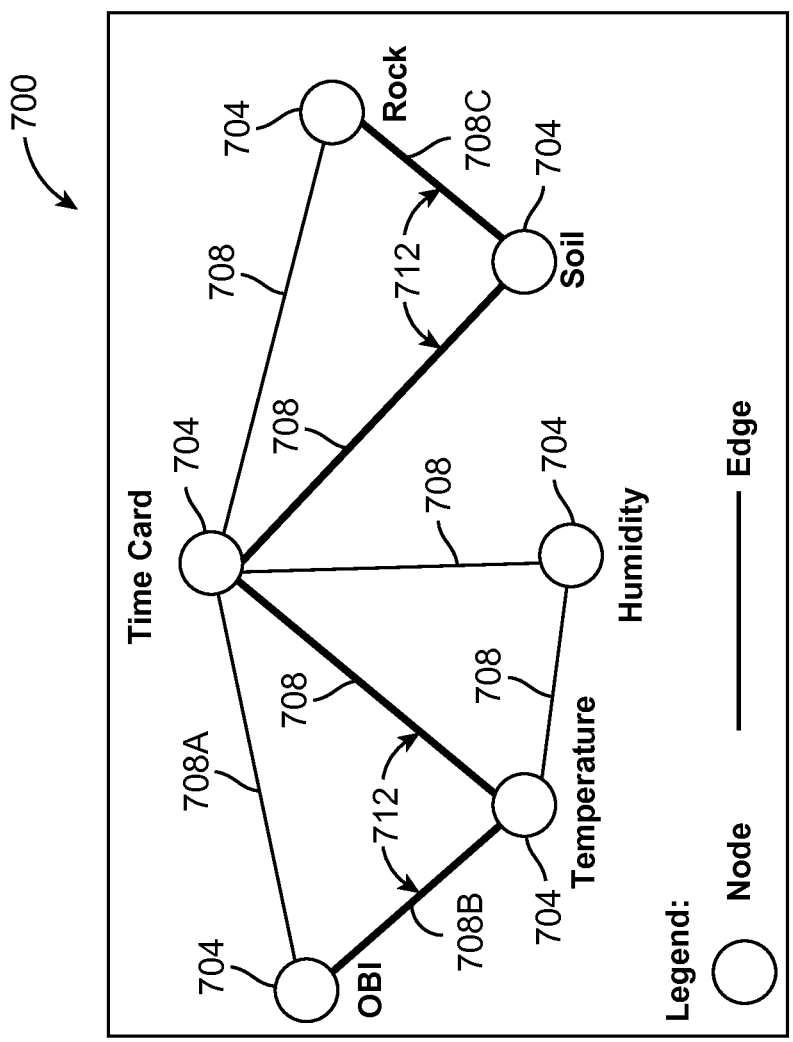
FIG. 7 is a diagram of an exemplary graph network for identifying needed data sources based on a graph-theoretic approach.

In the approach of the present instantiation, the available data sources are queried to identify the data sources that can provide the needed data items based on the required data items identified from a user query. For instance, if payload, soil type, and temperature are the needed data items for a given query, the potential data sources are the OBI, Soil, and Temperature data sources, as represented in FIG. 7. Among the identified three data sources, only the OBI and Temperature data sources share common temporal fusion type, and thus the OBI and Temperature data can be fused. However, they cannot be fused with the Soil data source as the Soil data source does not contain temporal fusion type. FIG. 7 shows that a path 712 connecting three data sources, i.e., vertices 708, (path 712 shown in bold lines) can be created only if the path traverses through time card data source vertex. Thus, if the time card data source is considered, the three data sources (i.e., the OBI, Temperature, and Soil data sources) can be fused since time card data source contains both spatial and temporal fusion types. Such a data source that facilitates fusion among a set of needed data sources is termed as "an auxiliary data source." Thus, to answer a given query, a set of applicable data sources can comprise both needed (in this example, the OBI, Temperature and Soil data sources) and one or more auxiliary data sources (in this example, the time card data source). The advantage of a graph-theoretic approach is that auxiliary data source can be readily identified, and such identification of auxiliary data source(s) is difficult without leveraging a graph-structure that captures the relationships (i.e., which data sources share one or more common fusion type(s)) among the data sources.

The exemplary reasoning mechanism for finding a path with one or more possible auxiliary data sources is similar to a minimum spanning tree (MST) method that finds a path connecting all the vertices in a given graph, and the sum of weights of the edges in the path is minimized. However, the reasoning mechanism for finding a path with one or more possible auxiliary data sources is different from the MST method in that: 1) a path only constitutes a set of vertices (say k vertices), which is smaller than all the vertices (i.e., k-minimum spanning tree), and 2) all the k vertices are not known ahead of time since an auxiliary data source needs to be identified, if needed. Thus, an existing MST method cannot be used to find the path. The reasoning mechanism for finding a path with possible auxiliary data source is an NP-complete problem since k-minimum spanning tree problem is an NP-complete problem. Since there is no method for solving an NP-hard problem in polynomial time, the present inventors have devised the heuristic method explained next.

In a first step of the heuristic method, a vertex 704 representing a needed data source is selected (e.g., the OBI data source). This heuristic method is unique to the problem of finding applicable set of data sources. When the data source is selected, it is pushed into a stack data structure. In a second step, each vertex 704 adjoining the selected vertex is checked to find out if it represents a needed data source. In the given example of FIG. 7, vertex 704 representing the OBI data source is connected with vertices representing the TimeCard and Temperature data sources. This heuristic method will select the Temperature data source, and corresponding vertex, as it is one of the needed data sources. If there is no adjoining vertex representing a needed data source, the method will pick an adjoining vertex that is highly connected. For example, once vertex 704 representing the Temperature data source is selected, it is connected to vertices representing the OBI, Humidity, and TimeCard data sources. As the OBI data source is already selected, the method will select the TimeCard data source (vertex 704) over the Humidity data source (vertex), since the TimeCard data source (vertex) is connected to four data sources compared to the Humidity data source (vertex), which is connected to only two data sources (vertices). The process continues until all the needed data sources are selected. The data sources stored in the stack data structure are the set of applicable sets of data sources.

Use of Plan Generation Methods to Perform Data Fusion Operations

This section describes technical details related to the GraphPlan and HTN planning methods according to the present instantiations used to generate data fusion plans. Terminology and basic representations used in GraphPlan and HTN implementations are first presented for clarity.

Definitions and Terminology

Proposition: In planning, the state of the world is encoded as either a variable or a set of variables called "propositions." In the present instantiations, the term "proposition" is used to represent the state of a given data source. Within the scope of this disclosure (i.e., data fusion domain), a proposition has three main components, namely 1) a set of fusion types 2) a name of the given data source, and 3) a set of data items. A fusion type of a data source is used to represent the properties (i.e., levels of detail, representation, and reference system) of a data source. The proposition is represented as a Proposition class (e.g., in object-oriented Java programming language) that contains the three attributes described above. The fusion type is represented as a FusionType class having three attribute classes, namely, LevelofDetails, Representation, and ReferenceSystem classes, to represent level of detail, representation, and reference system respectively. Since a data source can contain more than one fusion types (e.g., Time Card in Table 1, above), the Proposition class uses a Vector data type to represent a set of fusion types. In addition, in the Proposition class, the name of the data source is represented as a String data type and a set of data items is represented as a Vector data type.

Action: In planning, an "action" is responsible for changing the state of the world. For instance, an action called TransformStatePlaneToWGS, when applied to the given data source in a State Plane coordinate system, will change the coordinate system to the WGS coordinate system. In this instantiation, an action is represented as an Action class, which has three subclasses: 1) Transformation, 2) Merging, and 3) NoAction classes. NoAction class requires no action. The Transformation class is used to transform the level of details (e.g., aggregating minutes to hour), the representation (e.g., convert a polygon feature to a set of point features), and the reference system (e.g., convert a State Plane coordinate to a WGS coordinate). The Merging class is responsible for merging two data sources that have a common fusion type. Two data sources share a common fusion type when their levels of detail, representations, and reference systems are exactly the same. For example, two spatial data sources, namely, the Soil and Rock data sources in the present example, share a common fusion type when their levels of detail are in the Mile class, their representations are in the Polygon class, and their reference systems are in the State Plane class. There are two types of merging actions: 1) spatial and 2) temporal. Spatial merging merges two data sources with common spatial fusion type, while temporal merging action merges two data sources with common temporal fusion type. The Action class contains two important attributes: 1) preconditions (i.e., a set of conditions that must hold before an action can be executed) and 2) post-conditions (i.e., a set of effects that ensue when an action is executed). Post-conditions of an action constitute add lists (i.e. a set of added propositions) and delete lists (i.e. a set of deleted propositions). For instance, in the above example of action TransformStatePlaneToWGS, the value for the reference system attribute in the added proposition is the WGS coordinate system class and the value for the reference system attribute in the deleted proposition is the StatePlane coordinate system class.

Plan: In planning, a "plan" is defined as a sequence of actions. A plan can be either a strict sequence of actions with no parallel actions or a sequence of actions with parallel actions. A plan with strict sequence of actions is called a "linear plan," while a plan with parallel actions is called a "concurrent plan." In these instantiations, the GraphPlan and HTN planning methods are specifically described as examples. These methods can generate concurrent plans and linear plans respectively.

Planning Method and Its Properties: A "planning method" (also known as "planner") is a reasoning mechanism that takes three inputs (i.e., initial states, goal states, and a set of actions), and generates a plan or a set of plans as an output. Planning methods are evaluated on three properties: 1) soundness, 2) completeness, and 3) optimality. A planning method is said to be sound if it generates valid plan(s). A plan is called a valid plan when all the initial states and goal states are satisfied, and no constraints are violated. Similarly, a planning method is said to be complete when a solution (i.e., plan) can be found whenever it actually exists. A strictly complete planning method can generate all possible solutions that exist. A planning method is said to be optimal when a solution is consistent with some measure of plan quality. Measures, such as number of plan steps and shortest time to execute plan, can be used for plan quality. The GraphPlan and HTN methods, described in this disclosure, are sound and complete (not strictly). In addition, the GraphPlan method is optimal in terms of number of planning steps as it guarantees a shortest sequence of steps.

Description of GraphPlan Method

The GraphPlan method employs two main steps to generate a plan. The first step is graph expansion and the second step is a plan search. In the graph expansion step, it uses search procedures similar to iterative deepening, wherein the method expands the graph by one level at a time (described below). After graph expansion, the method searches backward from the last level to the first level to find a plan in the plan search step. In order to perform graph expansion and plan search, the method uses a graph data structure as described below.

GraphPlan: Data Structure

Figure 8:
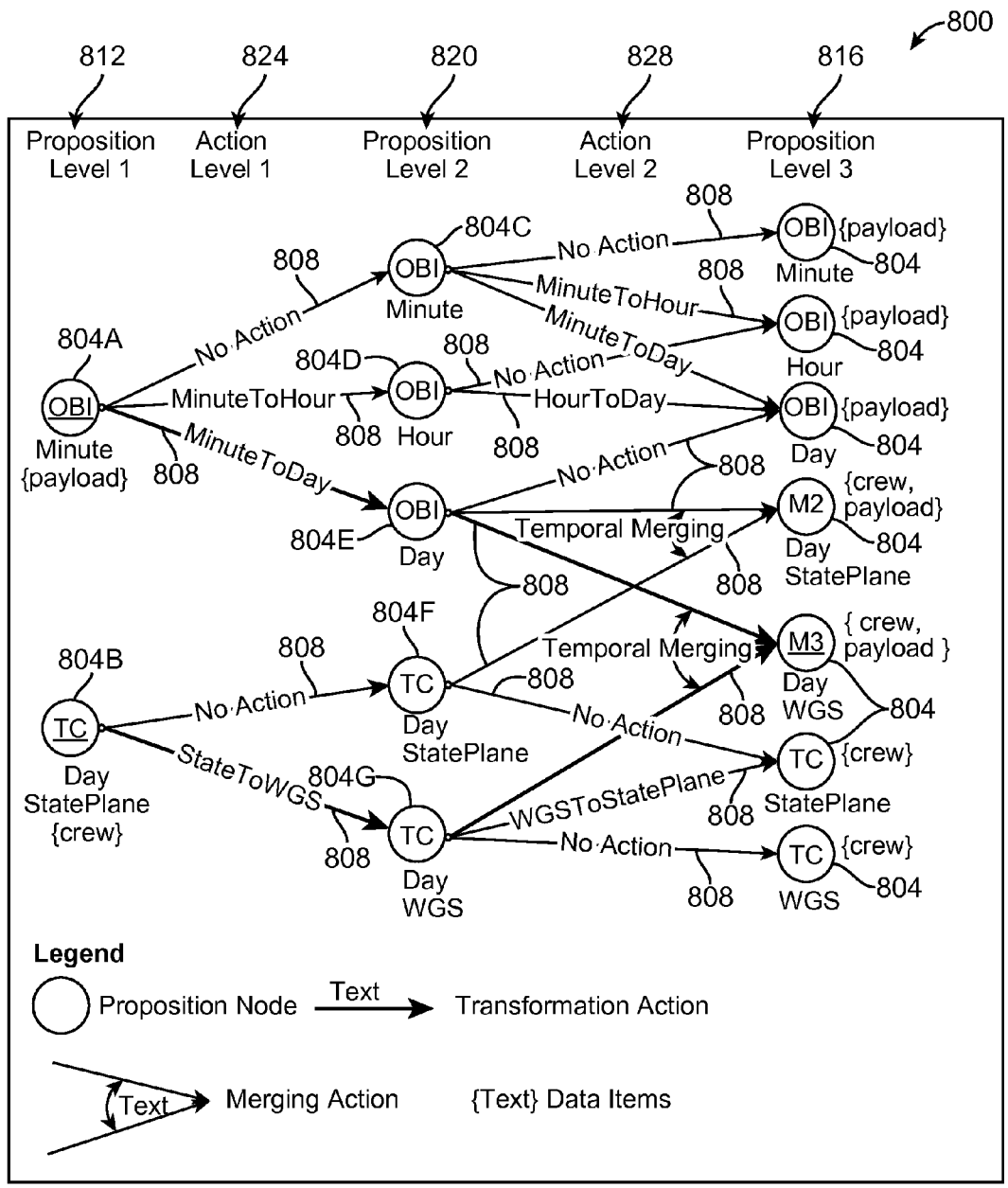
FIG. 8 is a diagram of an exemplary planning graph structure associated with a GraphPlan planner.

The GraphPlan method of the present embodiment uses a graph structure, illustrated by graph structure 800 of FIG. 8, to search for a plan. Graph structure 800 is a directed-leveled graph. Graph structure 800 primarily consists of two level types, which are the proposition level and action level types. The level types alternate between proposition and action, wherein a proposition level contains a set of proposition nodes (each proposition node represents a proposition) (shown as circles 804 in FIG. 8) and an action level contains a set of action nodes, each action representing an action (shown as text within arrows 808 in FIG. 8). Each proposition node 804 keeps track of the predecessor action nodes and successor action nodes. However, proposition nodes 804 in the first level 812 do not have predecessor action nodes and the proposition nodes in the last level 816 do not have successor action nodes. Similarly, each action node 808 keeps track of the predecessor proposition nodes 804 and successor proposition nodes. Graph structure 800 containing proposition levels and action levels is created during the graph expansion step, as described in the next section. A valid plan is searched during the plan search step, which is described after the graph expansion step.

GraphPlan Method: Graph Expansion

In a GraphPlan method, the first proposition level contains all of proposition nodes that represent the initial states of a given planning problem. In the present disclosure, these initial proposition nodes represent a set of data sources to be fused. In the present example of graph structure 800 of FIG. 8, the structure has three proposition levels 812, 820, 816, in order of level, and two action levels 824, 828, also in order of level. First proposition level 812 consists of two proposition nodes 804A and 804B that represent two data sources in their original forms, namely the OBI and Time Card data sources, to be fused.

For each proposition node 804 or set of proposition nodes, the task is to find a set of applicable actions. An action is defined to be applicable when the preconditions of the action match with the given proposition node. The actions MinuteToHour, MinuteToDay, and NoAction are applicable to the OBI data source (i.e., the proposition) as the preconditions of these actions match as the (temporal) level of detail of the OBI data source is Minute. Actions MinuteToHour and MinuteToDay convert the levels of detail of a data source from Minute to Hour and Minute to Day respectively. In the next proposition level, i.e., level 820, the OBI data source with level of detail in Minute is transformed into three propositions with Minute, Hour and Day level of details with the help of MinuteToHour and MinuteToDay actions respectively.

The NoAction action allows every proposition that appears in the $i^{th}$ proposition level to appear in the next $i+1^{th}$ proposition level. The NoAction action is always applicable to any given proposition. In other words, the NoAction action keeps the state of a data source the same as its previous state/proposition. The graph expansion continues to expand until the propositions at the latest proposition level match goal propositions when a valid plan is feasible. In the case when a valid plan is not feasible, graph expansion can be halted when a set of unique propositions at $i^{th}$ level exactly matches with a set of unique propositions at $i+1^{th}$ level. In other words, one can think that all possible search space has been explored at the $i^{th}$ level and an additional $i+1^{th}$ level cannot find unexplored search space.

During graph expansion, the GraphPlan method checks for mutual exclusions (also called conflicts) and propagates these mutual exclusions relations among proposition nodes. Two proposition nodes at a given proposition level (say $i^{th}$ level) are mutually exclusive if no valid plan could make both propositions true at the given proposition level. For instance, in second proposition level 820, proposition nodes 804C, 804D, and 804E corresponding to the OBI data source with Hour, Minute and Day levels of detail are mutually exclusive of each other. Similarly, at second proposition level 820, the proposition nodes 804F and 804G corresponding to the time card data source with State Plane and WGS reference systems are mutually exclusive.

The GraphPlan method checks for the actions that cause for two types of mutual exclusions: 1) interference and 2) competing needs. If either of the actions deletes a precondition or adds a list of the other action, the two actions are said to be interfering with each other. For example, two actions MinuteToHour and HourToDay are exclusive (due to interference) because the add list of action MinuteToHour is the proposition with the OBI data source in Hour which is deleted by action HourToDay. Similarly, if the precondition of action "A" and the precondition of action "B" are mutually exclusive of each other in the previous proposition level, the actions are competing for the same needs. The actions MinuteToHour and HourToDay in Action Level 2 828 are competing for needs as the respective preconditions, which are the OBI data source with Minute level of detail and the OBI data source with Hour level of detail, are mutually exclusive of each other. During graph expansion, the method marks the mutually exclusive propositions and actions. Information about mutually exclusive propositions and actions is stored at respective proposition and action nodes and this information is later used during plan search to find valid plan. The mutual exclusions are not considered during graph expansion, and such relaxation results in faster computation.

GraphPlan Method: Plan Search

Once a graph structure, such as graph structure 800 (also called a "plan graph") is created, the GraphPlan method uses a backward search to find a valid plan. The backward search starts with the goal proposition(s) in last proposition level 816. In plan graph 800, there is only one goal proposition labeled "M3" in third proposition level 816. However, there can also be a multiple number of goal propositions. The backward search finds either an action or a set of actions in the preceding action level (e.g., second action level 820 in graphplan 800) whose add-list proposition(s) satisfies the goal proposition(s). The add-effect proposition of action TemporalMerging in second action level 828 matches with the goal proposition. Now, the preconditions of action TemporalMerging become the goal propositions (i.e., OBI with Day and TimeCard with Day and WGS labels) in second proposition level 820. The backward chaining method recursively proceeds until it reaches first proposition level 812. The selected actions and propositions are checked for mutual exclusions. If a given path is not feasible, the method searches for a different path. If a path is feasible, it is guaranteed to find a valid plan (shown with bold lines in FIG. 8).

FIG. 8 presents a simplistic view of backward searching on a given plan graph 800 to convey features. In real world applications, a plan graph can contain hundreds of nodes, and there can be multiple paths which can be both feasible and infeasible. Thus, backward search can take a considerable amount of computational time. The validation section below discusses how the number of proposition nodes can increase considerably during the graph expansion step, and such memorization can help to speed up the computation during plan search.

Description of Hierarchical Task Network

An HTN planner starts with an abstract plan, which consists of a set of compound tasks. Each compound task is recursively decomposed into primitive tasks with the help of various methods. A method can be viewed as a recipe for how to decompose a task into a set of smaller sub-tasks, and such method is designed by a domain expert. In the context of the present disclosure, an HTN planner generates an abstract plan for fusing multiple data sources as the first step. The abstract plan contains a set of compound tasks, wherein each compound task corresponds to the task of fusing two data sources. For instance, four data sources, namely, the Soil, Rock, OBI, and Time Card data sources, need to be fused to understand the payload productivity variation due to soil and rock types. Assuming that the Soil and Rock data sources have spatial fusion type, Time Card has both spatial and temporal fusion type, and OBI data source has only temporal fusion type.

An example of an abstract plan that can automatically be generated using the method described is as follows: 1) create a graph structure with vertices representing a given set of data sources; 2) create edges between data sources that have a common fusion type (e.g., spatial and temporal), and 3) find an acyclic path connecting the given set of data sources. There can be a multiple number of acyclic paths. Any such acyclic path can be an abstract plan for HTN planner.

Figure 9:
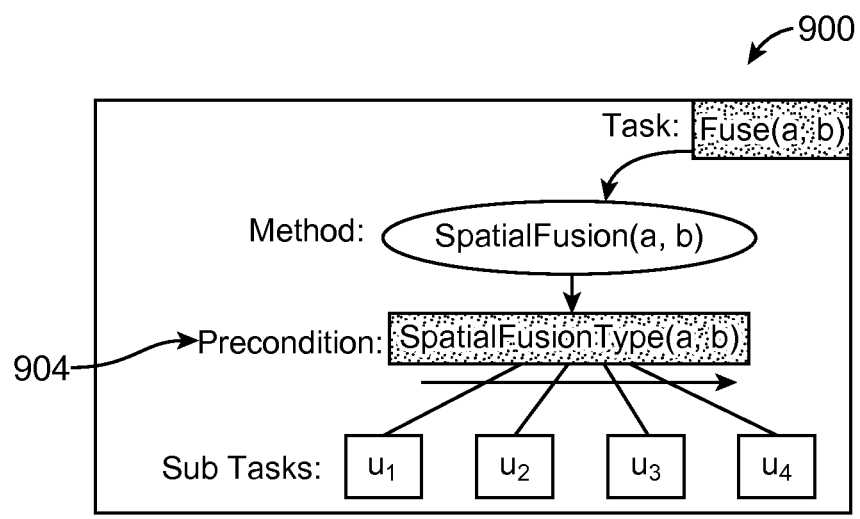
FIG. 9 is a flow diagram of an exemplary fusion task for a spatial fusion using a hierarchical task network planner.

An abstract plan for generating a data fusion plan consists of two types of fusion tasks: 1) a spatial fusion task and 2) a temporal fusion task. The spatial and temporal fusion tasks are similar except that spatial fusion task deals with spatial data sources and the temporal fusion task deals with temporal data sources only. FIG. 9 illustrates a method, here a "SpatialFusion" method 900 for decomposing spatial fusion task into sub-tasks. A precondition 904 of SpatialFusion method states that the two data sources have a spatial fusion type. The spatial fusion task is decomposed into four sub-tasks denoted by $u_1$, $u_2$, $u_3$ and $u_4$. Sub-tasks $u_1$, $u_2$, and $u_3$ transform two input data sources to same spatial level of details, spatial reference systems, and spatial representations respectively. Sub-task $u_4$ merges two data sources after their levels of details, reference systems and reference systems are of the same type.

There is a strict ordering of sub-tasks in method 900 shown in FIG. 9. In other words, sub-task $u_1$ is followed by sub-task $u_2$, which is followed by sub-task by $u_3$ (which is followed by sub-task $u_4$). Formally, such strict ordering of sub-tasks is represented as {u1, u2, u3, u4}, and such method is called a "totally ordered" method. If there is no strict ordering of sub-tasks, such method is called a "partially ordered" method. For instance, sub-tasks $u_1$, $u_2$, and $u_3$ can be executed in any order, except sub-task $u_4$ which needs to be executed after sub-tasks $u_1$, $u_2$, and $u_3$. Such partial ordering of sub-tasks is represented as $\{(u_1, u_2, \text{and } u_3), (u_4)\}$. In the context of the present disclosure, both totally ordered and partially ordered methods can be used to generate plan.

Each sub-task (e.g., $u_1$, $u_2$, $u_3$, and $u_4$) is ultimately decomposed into primitive tasks, which are equivalent to actions in the GraphPlan method. Sub-tasks $u_1$, $u_2$, $u_3$ are decomposed into two primitive tasks (at most). For instance, sub-task $u_1$ requires changing the levels of details of at most two data sources. Sub-task $u_4$ is decomposed into only one primitive task, as it is related to merging two data sources. An HTN planner can perform a selective search to look for an action (to execute) for a primitive task. The search process can be expedited by classifying the actions based on four sub-categories namely: 1) level of details; 2) representation; 3) reference systems; and 4) merging under spatial and temporal category. An advantage of classifying actions is that it can help to reduce search space. Such search space reduction is not possible for a GraphPlan planner.

While GraphPlan and HTN planners were utilized for several embodiments implemented by the present inventors, those skilled in the art will understand that other automated planners can be used.

FIG. 10 shows a diagrammatic representation of one embodiment of a machine in the exemplary form of a computer system 1000 that contains a set of instructions for implementing any one or more of the aspects and/or methodologies of the present disclosure, including implementing ADF system 204 depicted in FIG. 2. As an example, computer system 1000 can be used as web server 224 of FIG. 2. Alternatively, computer system 1000 can represent any other computing system, device, etc., that can implement an ADF system made in accordance with the present disclosure, or any component(s) thereof or related thereto, such as the corresponding user interface(s). It is contemplated that multiple computing devices may be utilized to implement a specially configured set of instructions for causing the device to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine readable media) including, but not limited to, a random access memory component (e.g., a static RAM (SRAM), a dynamic RAM "DRAM", etc.), a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable storage media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable storage medium 1028 may provide nonvolatile and/or volatile storage of machine-readable instructions, data structures, program modules, and/or other data for computer system 1000. In one example, software 1020 may reside, completely or partially, within machine-readable storage medium 1028. In another example, software 1020 may reside, completely or partially, within processor 1004. It is noted that the term "machine-readable storage medium" does not include signals present on one or more carrier waves.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040 may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide a graphical representation of a utility resource, a location of a land parcel, and/or a location of an easement to a user. In addition to a display device, a computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A machine-readable storage medium containing machine-executable instructions for performing a method of answering a dynamic query having an answer that requires the fusing of data from among multiple heterogeneous data sources, said machine-executable instructions comprising:
   a first set of machine-executable instructions for receiving the dynamic query;
   a second set of machine-executable instructions for automatedly evaluating the dynamic query to determine data items and levels of detail needed to provide the answer;
   a third set of machine-executable instructions for automatedly developing a data-fusing plan based on an ontology of the multiple heterogeneous data sources as a function of the data items and levels of detail, wherein the data-fusion plan includes one or more steps for creating fused data;
   a fourth set of machine-executable instructions for automatedly executing the one or more steps to create the fused data based on the data items; and
   a fifth set of machine-executable instructions for automatedly generating the answer based on the fused data;
   wherein:
      said third set of machine-executable instructions includes machine-executable instructions for implementing a graph theoretic approach to determine which ones of the multiple heterogeneous data sources are needed to generate the answer;
      said machine-executable instructions for implementing the graph theoretic approach includes machine-executable instructions for constructing a graph of the multiple heterogeneous data sources;
      said machine-executable instructions for implementing the graph theoretic further includes machine-executable instructions for traversing the graph so as to determine a set needed data sources needed data to create the fused data; and
      said machine-executable instructions for traversing the graph includes machine-executable instructions for:
         starting with a needed data source:
         next selecting an adjacent connected needed data source, if available; and
         if none of the adjacent data sources is a needed data source, next selecting a more highly connected adjacent data source over a less highly connected adjacent data source.

2. A machine-readable storage medium according to claim 1, wherein said third set of machine-executable instructions includes machine-executable instructions for developing from the multiple heterogeneous data sources a set of needed data sources needed to generate the answer.

3. A machine-readable storage medium according to claim 2, wherein said third set of machine-executable instructions further includes machine-executable instructions for implementing an automated planning method to generate the data-fusing plan using the set of needed data sources.

4. A machine-readable storage medium according to claim 1, wherein said machine-executable instructions for constructing a graph includes machine-executable instructions for identifying the multiple heterogeneous data sources as vertices and connecting ones of the vertices with edges as a function of common data items within ones of the multiple heterogeneous data sources.

5. A machine-readable storage medium according to claim 1, wherein said machine-executable instructions for traversing the graph includes machine-executable instructions for identifying at least one auxiliary data source that links at least two of the needed data sources that do not share a common data element.

6. A machine-readable storage medium according to claim 1, wherein said machine-executable instructions for traversing the graph includes machine-executable instructions for traversing the graph as a function of the data items determined from said automated evaluating.

7. A machine-readable storage medium according to claim 1, wherein said third set of machine-executable instructions includes machine-executable instructions for determining a set of needed data sources needed for the fused data from among the multiple heterogeneous data sources as a function of the data items determined from said automatedly evaluating the dynamic query.

8. A machine-readable storage medium according to claim 1, wherein said machine-executable instructions for developing the data-fusing plan includes machine-executable instructions for implementing a planner to develop the data-fusing plan.

9. A machine-readable storage medium according to claim 8, wherein said machine-executable instructions for implementing the planner includes machine-executable instructions for creating a plan graph containing proposition levels and action levels between adjacent proposition levels.

10. A machine-readable storage medium according to claim 9, wherein said machine-executable instructions for implementing the planner includes machine-executable instructions for performing a backward search within the plan graph to generate the data-fusing plan.

11. A machine-readable storage medium according to claim 8, wherein said machine-executable instructions for implementing the planner includes machine-executable instructions for generating an abstract plan comprising a set of compound tasks.

12. A machine-readable storage medium according to claim 11, wherein said machine-executable instructions for implementing the planner further includes machine-executable instructions for decomposing ones of the set of compound tasks into primitive tasks.

13. A machine-readable storage medium according to claim 11, wherein said machine-executable instructions for generating an abstract plan includes machine-executable instructions for:
creating a graph structure having vertices representing a set of the multiple heterogeneous data sources;
creating edges between ones of the set of the multiple heterogeneous data sources having a common fusion type; and
finding an acyclic path connecting ones of the set of the multiple heterogeneous data sources.

14. A machine-readable storage medium according to claim 11, wherein said machine-executable instructions for executing the planner further comprise machine-executable instructions for decomposing ones of the set of compound tasks into primitive tasks.

15. A machine-readable storage medium containing machine-executable instructions for performing a method of answering a dynamic query having an answer that requires the fusing of data from among multiple heterogeneous data sources, said machine-executable instructions comprising:
a first set of machine-executable instructions for receiving the dynamic query;
a second set of machine-executable instructions for automatedly evaluating the dynamic query to determine data items and levels of detail needed to provide the answer;
a third set of machine-executable instructions for automatedly developing a data-fusing plan based on an ontology of the multiple heterogeneous data sources as a function of the data items and levels of detail, wherein the data-fusion plan includes one or more steps for creating fused data;
a fourth set of machine-executable instructions for automatedly executing the one or more steps to create the fused data based on the data items; and
a fifth set of machine-executable instructions for automatedly generating the answer based on the fused data;
wherein:
said third set of machine-executable instructions includes machine-executable instructions for implementing a graph theoretic approach to determine which ones of the multiple heterogeneous data sources are needed to generate the answer;
said machine-executable instructions for implementing the graph theoretic approach includes machine-executable instructions for constructing a graph of the multiple heterogeneous data sources;
said machine-executable instructions for implementing the graph theoretic further includes machine-executable instructions for traversing the graph so as to determine a set of needed data sources needed to create the fused data; and
said machine-executable instructions for traversing the graph includes machine-executable instructions for identifying at least one auxiliary data source that links at least two of the needed data sources that do not share a common data element.

16. A machine-readable storage medium according to claim 15, wherein said third set of machine-executable instructions includes machine-executable instructions for developing from the multiple heterogeneous data sources a set of needed data sources needed to generate the answer.

17. A machine-readable storage medium according to claim 16, wherein said third set of machine-executable instructions further includes machine-executable instructions for implementing an automated planning method to generate the data-fusing plan using the set of needed data sources.

18. A machine-readable storage medium according to claim 15, wherein said machine-executable instructions for constructing a graph includes machine-executable instructions for identifying the multiple heterogeneous data sources as vertices and connecting ones of the vertices with edges as a function of common data items within ones of the multiple heterogeneous data sources.

19. A machine-readable storage medium according to claim 15, wherein said machine-executable instructions for traversing the graph includes machine-executable instructions for traversing the graph as a function of the data items determined from said automated evaluating.

20. A machine-readable storage medium according to claim 15, wherein said third set of machine-executable instructions includes machine-executable instructions for determining a set of needed data sources needed for the fused data from among the multiple heterogeneous data sources as a function of the data items determined from said automatedly evaluating the dynamic query.

21. A machine-readable storage medium according to claim 15, wherein said machine-executable instructions for developing the data-fusing plan includes machine-executable instructions for implementing a planner to develop the data-fusing plan.

22. A machine-readable storage medium according to claim 21, wherein said machine-executable instructions for implementing the planner includes machine-executable instructions for creating a plan graph containing proposition levels and action levels between adjacent proposition levels.

23. A machine-readable storage medium according to claim 22, wherein said machine-executable instructions for implementing the planner includes machine-executable instructions for performing a backward search within the plan graph to generate the data-fusing plan.

24. A machine-readable storage medium according to claim 21, wherein said machine-executable instructions for implementing the planner includes machine-executable instructions for generating an abstract plan comprising a set of compound tasks.

25. A machine-readable storage medium according to claim 24, wherein said machine-executable instructions for implementing the planner further includes machine-executable instructions for decomposing ones of the set of compound tasks into primitive tasks.

26. A machine-readable storage medium according to claim 24, wherein said machine-executable instructions for generating an abstract plan includes machine-executable instructions for:
creating a graph structure having vertices representing a set of the multiple heterogeneous data sources;
creating edges between ones of the set of the multiple heterogeneous data sources having a common fusion type; and
finding an acyclic path connecting ones of the set of the multiple heterogeneous data sources.

27. A machine-readable storage medium according to claim 24, wherein said machine-executable instructions for executing the planner further comprise machine-executable instructions for decomposing ones of the set of compound tasks into primitive tasks.

28. A machine-readable storage medium containing machine-executable instructions for performing a method of answering a dynamic query having an answer that requires the fusing of data from among multiple heterogeneous data sources, said machine-executable instructions comprising:
a first set of machine-executable instructions for receiving the dynamic query;
a second set of machine-executable instructions for automatedly evaluating the dynamic query to determine data items and levels of detail needed to provide the answer;
a third set of machine-executable instructions for automatedly developing a data-fusing plan based on an ontology of the multiple heterogeneous data sources as a function of the data items and levels of detail, wherein the data-fusion plan includes one or more steps for creating fused data;
a fourth set of machine-executable instructions for automatedly executing the one or more steps to create the fused data based on the data items; and
a fifth set of machine-executable instructions for automatedly generating the answer based on the fused data;
wherein:
said machine-executable instructions for developing the data-fusing plan includes machine-executable instructions for implementing a planner to develop the data-fusing plan; and
said machine-executable instructions for implementing the planner includes:
machine-executable instructions for creating a plan graph containing proposition levels and action levels between adjacent proposition levels; and
machine-executable instructions for generating an abstract plan comprising a set of compound tasks.

29. A machine-readable storage medium according to claim 28, wherein said third set of machine-executable instructions includes machine-executable instructions for developing from the multiple heterogeneous data sources a set of needed data sources needed to generate the answer.

30. A machine-readable storage medium according to claim 29, wherein said third set of machine-executable instructions further includes machine-executable instructions for implementing an automated planning method to generate the data-fusing plan using the set of needed data sources.

31. A machine-readable storage medium according to claim 28, wherein said third set of machine-executable instructions includes machine-executable instructions for implementing a graph theoretic approach to determine which ones of the multiple heterogeneous data sources are needed to generate the answer.

32. A machine-readable storage medium according to claim 31, wherein said machine-executable instructions for implementing the graph theoretic approach includes machine-executable instructions for constructing a graph of the multiple heterogeneous data sources.

33. A machine-readable storage medium according to claim 32, wherein said machine-executable instructions for constructing a graph includes machine-executable instructions for identifying the multiple heterogeneous data sources as vertices and connecting ones of the vertices with edges as a function of common data items within ones of the multiple heterogeneous data sources.

34. A machine-readable storage medium according to claim 32, wherein said machine-executable instructions for implementing the graph theoretic further includes machine-executable instructions for traversing the graph so as to determine a set of needed data sources needed to create the fused data.

35. A machine-readable storage medium according to claim 34, wherein said machine-executable instructions for traversing the graph includes machine-executable instructions for traversing the graph as a function of the data items determined from said automated evaluating.

36. A machine-readable storage medium according to claim 28, wherein said third set of machine-executable instructions includes machine-executable instructions for determining a set of needed data sources needed for the fused data from among the multiple heterogeneous data sources as a function of the data items determined from said automatedly evaluating the dynamic query.

37. A machine-readable storage medium according to claim 28, wherein said machine-executable instructions for implementing the planner further includes machine-executable instructions for decomposing ones of the set of compound tasks into primitive tasks.

38. A machine-readable storage medium according to claim 28, wherein said machine-executable instructions for generating an abstract plan includes machine-executable instructions for:
creating a graph structure having vertices representing a set of the multiple heterogeneous data sources;
creating edges between ones of the set of the multiple heterogeneous data sources having a common fusion type; and finding an acyclic path connecting ones of the set of the multiple heterogeneous data sources.

39. A machine-readable storage medium according to claim 28, wherein said machine-executable instructions for executing the planner further comprise machine-executable instructions for decomposing ones of the set of compound tasks into primitive tasks.

40. A machine-readable storage medium containing machine-executable instructions for performing a method of answering a dynamic query having an answer that requires the fusing of data from among multiple heterogeneous data sources, said machine-executable instructions comprising:
   a first set of machine-executable instructions for receiving the dynamic query;
   a second set of machine-executable instructions for automatedly evaluating the dynamic query to determine data items and levels of detail needed to provide the answer;
   a third set of machine-executable instructions for automatedly developing a data-fusing plan based on an ontology of the multiple heterogeneous data sources as a function of the data items and levels of detail, wherein the data-fusion plan includes one or more steps for creating fused data;
   a fourth set of machine-executable instructions for automatedly executing the one or more steps to create the fused data based on the data items; and
   a fifth set of machine-executable instructions for automatedly generating the answer based on the fused data;
   wherein:
      said machine-executable instructions for developing the data-fusing plan includes machine-executable instructions for implementing a planner to develop the data-fusing plan; and
      said machine-executable instructions for implementing the planner includes:
         machine-executable instructions for generating an abstract plan comprising a set of compound tasks; and
         machine-executable instructions for decomposing ones of the set of compound tasks into primitive tasks.

41. A machine-readable storage medium according to claim 40, wherein said third set of machine-executable instructions includes machine-executable instructions for developing from the multiple heterogeneous data sources a set of needed data sources needed to generate the answer.

42. A machine-readable storage medium according to claim 41, wherein said third set of machine-executable instructions further includes machine-executable instructions for implementing an automated planning method to generate the data-fusing plan using the set of needed data sources.

43. A machine-readable storage medium according to claim 40, wherein said third set of machine-executable instructions includes machine-executable instructions for implementing a graph theoretic approach to determine which ones of the multiple heterogeneous data sources are needed to generate the answer.

44. A machine-readable storage medium according to claim 43, wherein said machine-executable instructions for implementing the graph theoretic approach includes machine-executable instructions for constructing a graph of the multiple heterogeneous data sources.

45. A machine-readable storage medium according to claim 44, wherein said machine-executable instructions for constructing a graph includes machine-executable instructions for identifying the multiple heterogeneous data sources as vertices and connecting ones of the vertices with edges as a function of common data items within ones of the multiple heterogeneous data sources.

46. A machine-readable storage medium according to claim 44, wherein said machine-executable instructions for implementing the graph theoretic further includes machine-executable instructions for traversing the graph so as to determine a set of needed data sources needed to create the fused data.

47. A machine-readable storage medium according to claim 46, wherein said machine-executable instructions for traversing the graph includes machine-executable instructions for traversing the graph as a function of the data items determined from said automated evaluating.

48. A machine-readable storage medium according to claim 40, wherein said third set of machine-executable instructions includes machine-executable instructions for determining a set of needed data sources needed for the fused data from among the multiple heterogeneous data sources as a function of the data items determined from said automatedly evaluating the dynamic query.

* * * * *